US009734587B2

(12) United States Patent
Sun et al.

(10) Patent No.: US 9,734,587 B2
(45) Date of Patent: Aug. 15, 2017

(54) LONG TERM OBJECT TRACKER

(71) Applicant: Apple Inc., Cupertino, CA (US)

(72) Inventors: Zehang Sun, Saratoga, CA (US);
Toshihiro Horie, San Jose, CA (US);
Xin Tong, Los Altos, CA (US); Peter Chou, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 126 days.

(21) Appl. No.: 14/871,955

(22) Filed: Sep. 30, 2015

(65) Prior Publication Data

US 2017/0091952 A1    Mar. 30, 2017

(51) Int. Cl.
*G06K 9/00* (2006.01)
*G06T 7/20* (2017.01)
*G06T 5/10* (2006.01)
*G06K 9/62* (2006.01)
*G06K 9/46* (2006.01)
*H04N 7/18* (2006.01)

(52) U.S. Cl.
CPC ............ *G06T 7/204* (2013.01); *G06K 9/4609* (2013.01); *G06K 9/4671* (2013.01); *G06K 9/6212* (2013.01); *G06K 9/6215* (2013.01); *G06K 9/6223* (2013.01); *G06T 5/10* (2013.01); *G06T 2207/10016* (2013.01); *G06T 2207/20024* (2013.01); *G06T 2207/20076* (2013.01); *G06T 2207/30241* (2013.01)

(58) Field of Classification Search
USPC ........ 382/100, 103–104, 106–107, 154, 162, 382/168, 173, 181, 199, 209, 219, 232, 382/254, 274, 276, 286–291, 305, 312, 382/159, 225; 348/135, 140, 155
See application file for complete search history.

(56) References Cited

U.S. PATENT DOCUMENTS 7,657,059 B2 * 2/2010 Olson ................... G06T 7/20
382/103
8,059,915 B2 11/2011 Sharon et al.
(Continued)

OTHER PUBLICATIONS

Gentsos, et al., "Real-Time Canny Edge Detection Parallel Implementation for FPGAs," Conference Paper—Dec. 2010—DOI: 10.1109/ICECS.2010. 5724558—Source DBLP, 4 pages. http://www.researchgate.net/publication/221457790.

*Primary Examiner* — Seyed Azarian
(74) *Attorney, Agent, or Firm* — Chia Hsin Chu; Page Ponsford; DLA Piper LLP US

(57) ABSTRACT

In some implementations, a computing device can track an object from a first image frame to a second image frame using a self-correcting tracking method. The computing device can select points of interest in the first image frame. The computing device can track the selected points of interest from the first image frame to the second image frame using optical flow object tracking. The computing device can prune the matching pairs of points and generate a transform based on the remaining matching pairs to detect the selected object in the second image frame. The computing device can generate a tracking confidence metric based on a projection error for each point of interest tracked from the first frame to the second frame. The computing device can correct tracking errors by reacquiring the object when the tracking confidence metric is below a threshold value.

18 Claims, 12 Drawing Sheets

(56) References Cited

U.S. PATENT DOCUMENTS

| | | | |
|---|---|---|---|
| 8,705,876 B2* | 4/2014 | Vaddadi | G06K 9/6211 |
| | | | 382/225 |
| 8,761,466 B2 | 6/2014 | Kang et al. | |
| 2005/0047647 A1* | 3/2005 | Rutishauser | G06K 9/3233 |
| | | | 382/159 |
| 2014/0363048 A1* | 12/2014 | Vrcelj | G06K 9/78 |
| | | | 382/103 |
| 2015/0055821 A1* | 2/2015 | Fotland | G06K 9/3241 |
| | | | 382/103 |

* cited by examiner

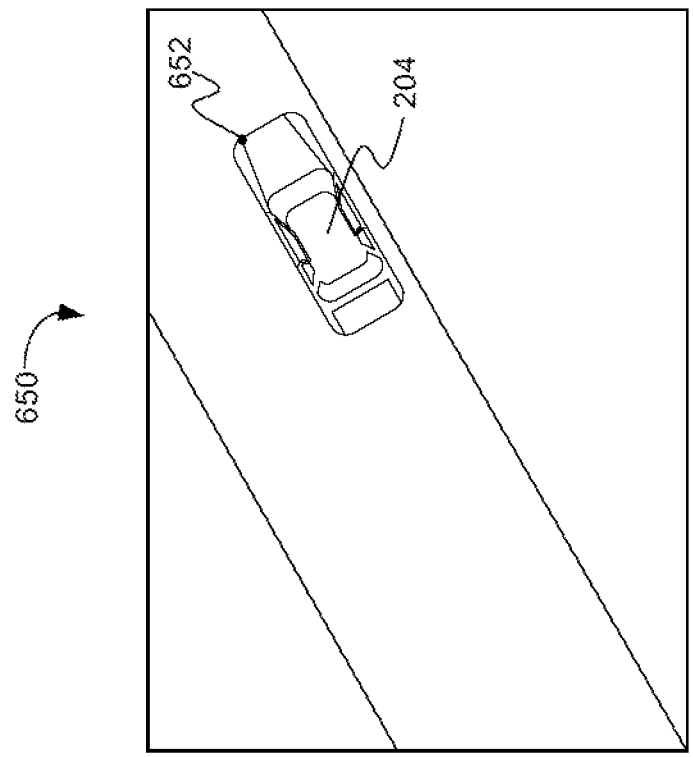
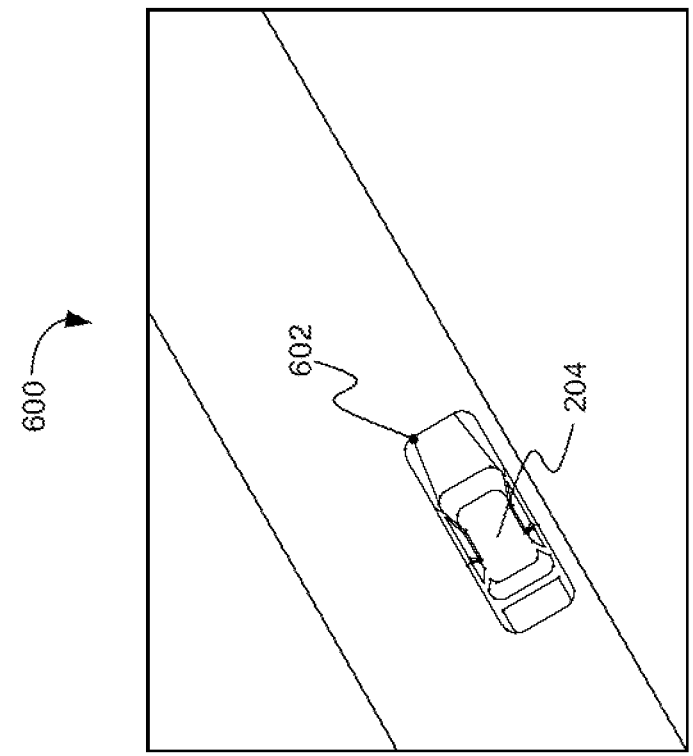
FIG. 6

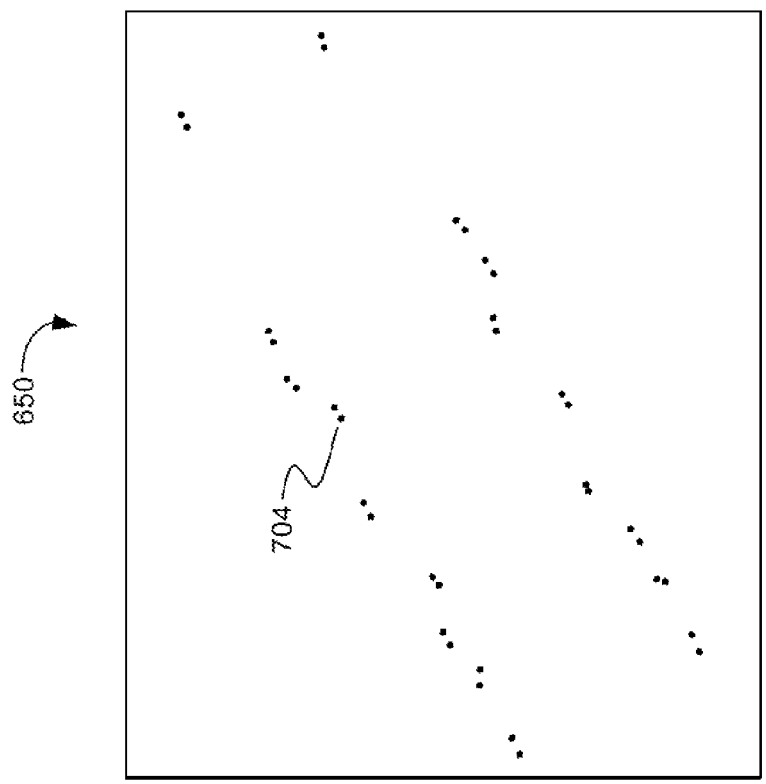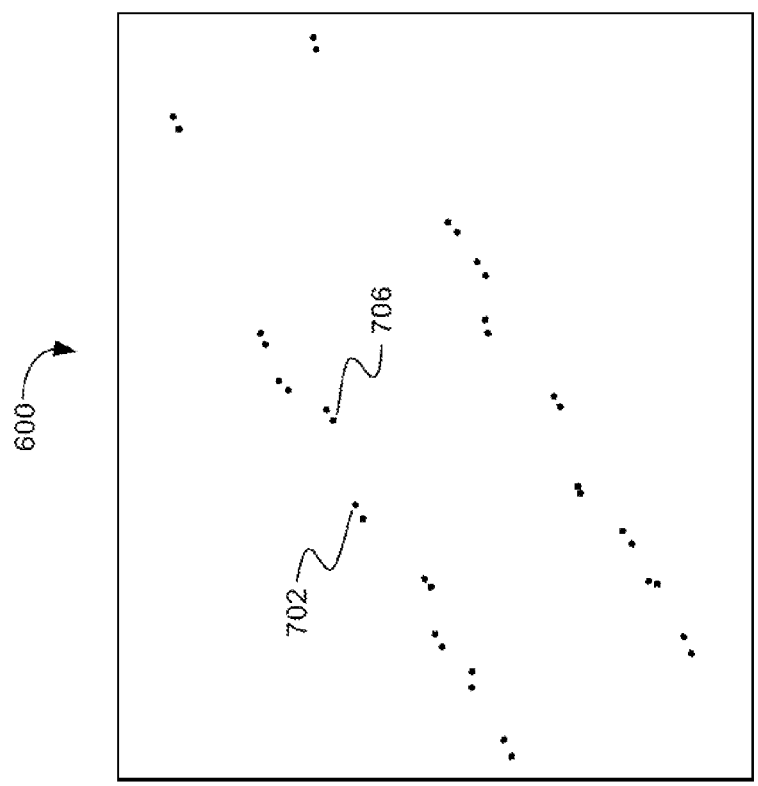
FIG. 7

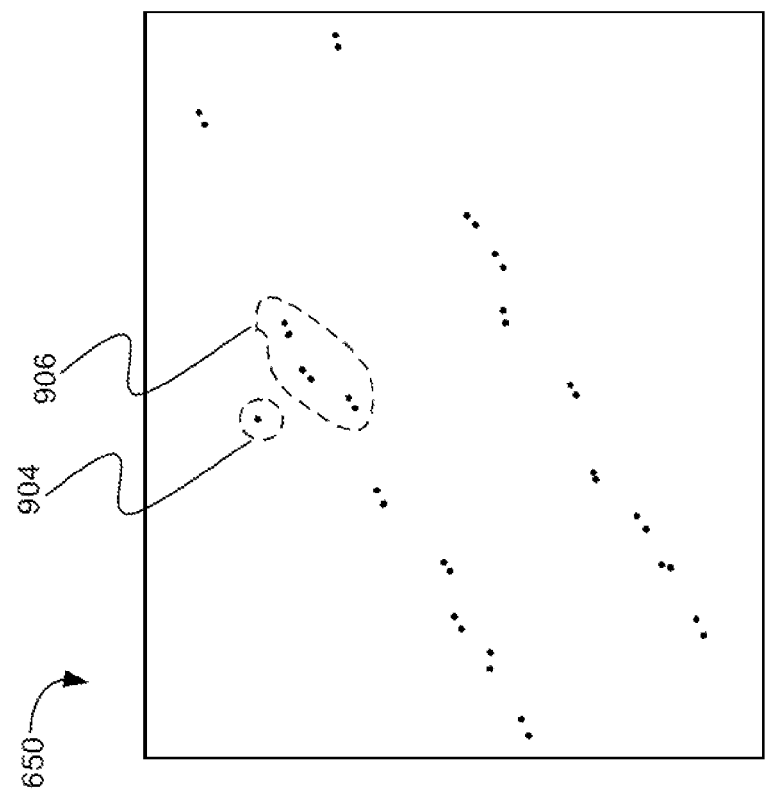
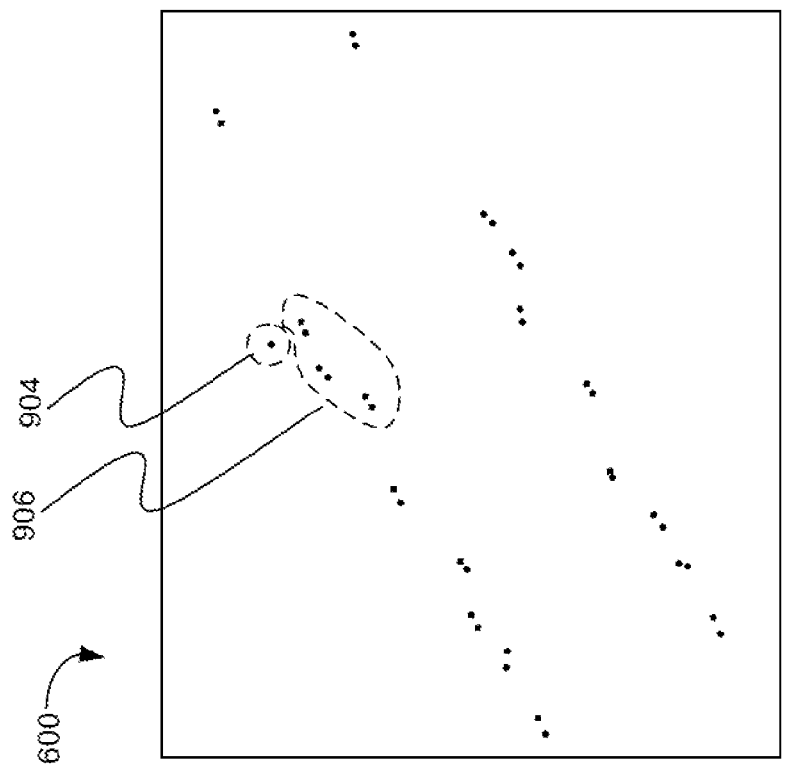
FIG. 9

LONG TERM OBJECT TRACKER

TECHNICAL FIELD

The disclosure generally relates to tracking objects in images.

BACKGROUND

Object tracking can be defined as the problem of estimating the trajectory of an object in the image plane as it moves around a scene. Object tracking can be used for allowing human interaction with a computing device, video editing, security and surveillance, video communication and compression, augmented reality, and other video leveraging technologies. Typical object tracking methods that perform frame-to-frame tracking assume no complete occlusion or disappearance of the object being tracked. Once the object is occluded or moved outside of the field of view, even for only a split second, the tracking will fail and user intervention will be required to reacquire the object. Another shortcoming of current object tracking methods is that the tracking software has no way to determine tracking accuracy.

SUMMARY

In some implementations, a computing device can track an object from a first image frame to a second image frame using a self-correcting tracking method. The computing device can select points of interest in a user-selected area of the first image frame based on eigenvalues generated for each pixel in the selected area. The computing device can track the selected points of interest from the first image frame to the second image frame using optical flow object tracking to determine a point of interest in the second image frame that matches a selected point of interest in the first image frame. The computing device can prune the matching pairs of points and can generate a transform based on the remaining matching pairs to detect the selected object in the second image frame. The computing device can generate a tracking confidence metric based on a projection error for each point of interest tracked from the first frame to the second frame. The computing device can correct tracking errors by reacquiring the object when the tracking confidence metric is below a threshold value.

Particular implementations provide at least the following advantages: object tracker 104 can perform long-term object tracking; object tracker 104 can select more reliable points of interest; object tracker 104 can handle occlusion, object disappearance, and redetection; object tracker 104 can provide a tracking confidence indicator indicating how good and reliable the current tracking results are; object tracker 104 is able to correct tracking results automatically.

Details of one or more implementations are set forth in the accompanying drawings and the description below. Other features, aspects, and potential advantages will be apparent from the description and drawings, and from the claims.

DESCRIPTION OF DRAWINGS

FIG. 6 illustrates an example optical flow method for tracking interest points from a first frame to a second frame.

FIG. 7 illustrates an example of the forward-backward check for determining the correctness of matching point pairs.

FIG. 9 illustrates an example of a point clustering check for determining the correctness of matching point pairs

Like reference symbols in the various drawings indicate like elements.

DETAILED DESCRIPTION

Figure 1:
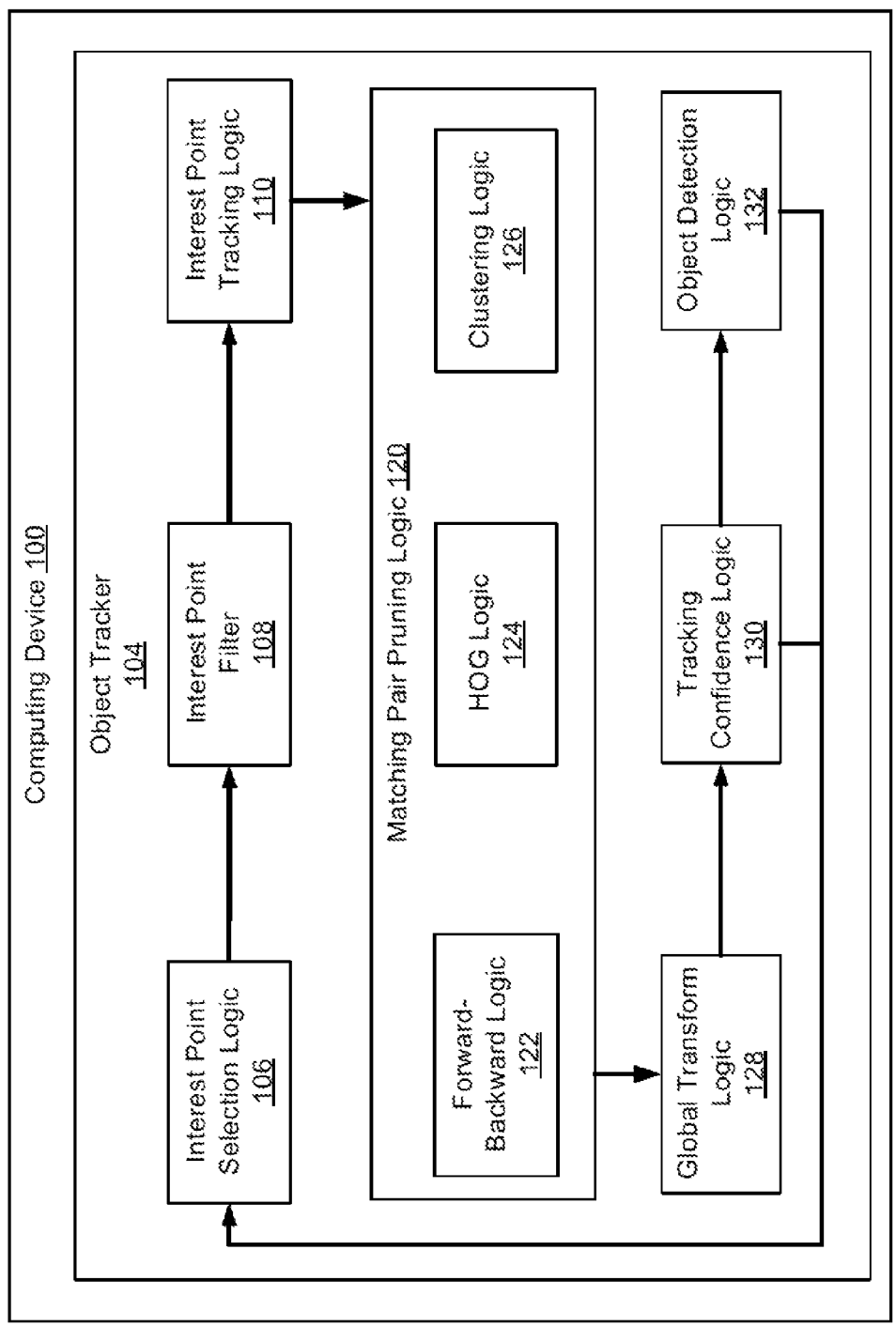
FIG. 1 is a block diagram of an example computing device.

FIG. 1 is a block diagram of an example computing device 100. In some implementations, computing device 100 can be configured with an error-detecting and self-correcting long term object tracker 104. For example, object tracker 104 can be software (e.g., an application, utility, function, software library, etc.) executed by processors of computing device 100. Object tracker 104 can be a standalone application. Object tracker 104 can be a software module accessed by a video processing application. Object tracker 104 can be a long-term affine tracker capable of handling occlusions, target disappearance, and/or target re-entry, for example.

Selecting an Object to Track

Figure 2:
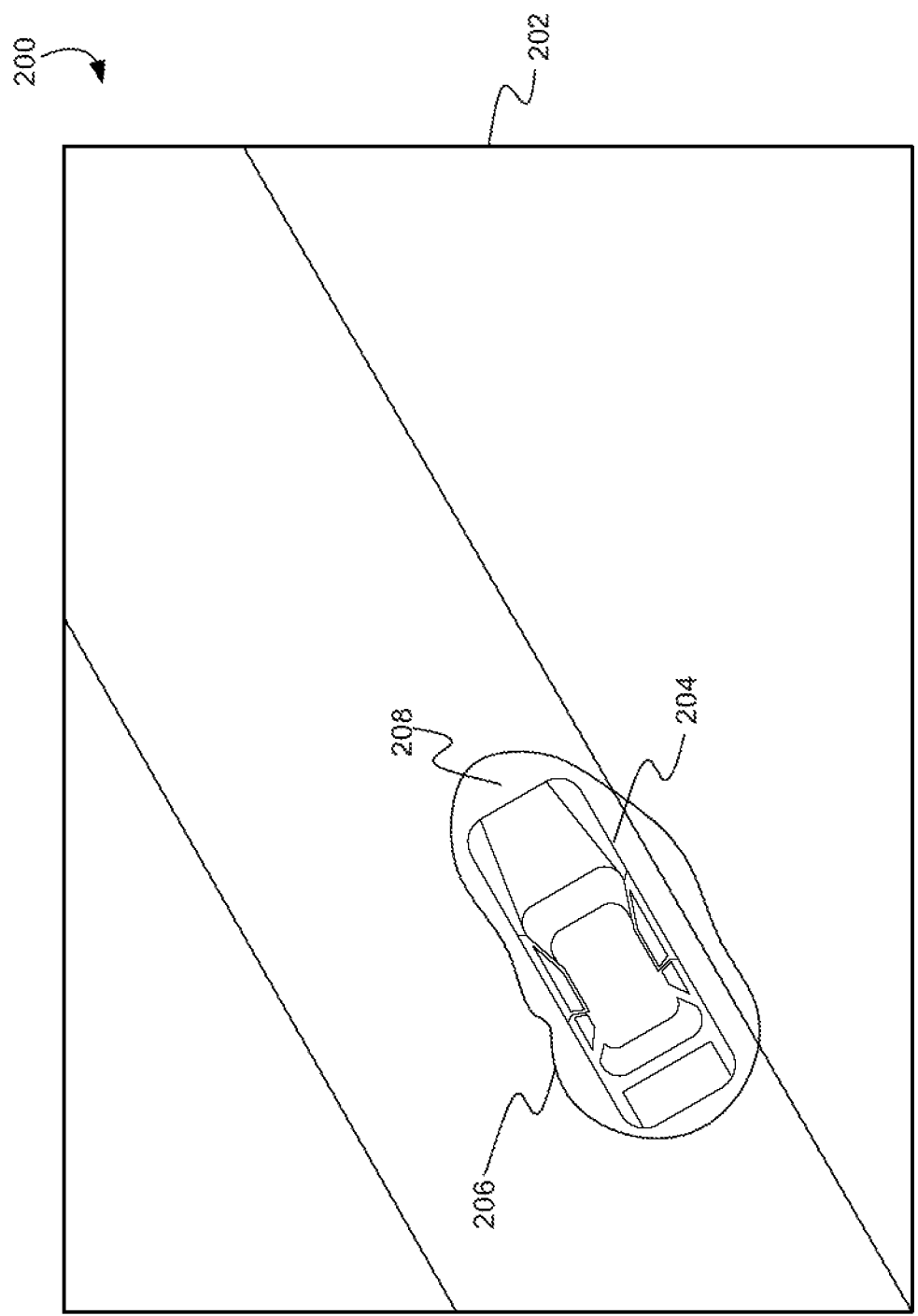
FIG. 2 illustrates an example graphical user interface for receiving user selection of an object to be tracked.

FIG. 2 illustrates an example graphical user interface 200 for receiving user selection of an object to be tracked. For example, graphical user interface (GUI) 200 can be a graphical user interface of object tracker 104 presented on a display of computing device 100. In some implementations, GUI 200 can present video media content. For example, object tracker 104 can present user interfaces that allow a user to select a video (e.g., video file, video content item, etc.) for processing by object tracker 104 according to well-known methods. After the video is selected by the user and loaded into memory by object tracker 104, object tracker 104 can present the video on GUI 200. The user can navigate through the video (e.g., frame by frame, chapter by chapter, etc.) until the user selects a frame of the video that includes an object that the user would like to track. For example, the user can select frame 202 that includes an image of object 204 (e.g., a car, a person, some other foreground object, etc.). In the description that follows, a "frame" refers to one of many images in a sequence of images that make up a video, thus the terms "frame" and "image" may be used interchangeably.

In some implementations, GUI 200 can receive user input selecting an object to be tracked by object tracker 104. For example, GUI 200 can provide a selection tool (e.g., pointer, pencil, etc.) that allows a user to draw line around an object to be tracked. For example, the user can use the selection tool to draw line 206 that circumscribes an area 208 of frame 202 that includes object 204. After the user selects area 208, object tracker 104 can select points of interest within area 208 to be used for tracking object 204 from one frame (e.g., frame 202) to subsequent frames.

Selecting Interest Points

Figure 3:
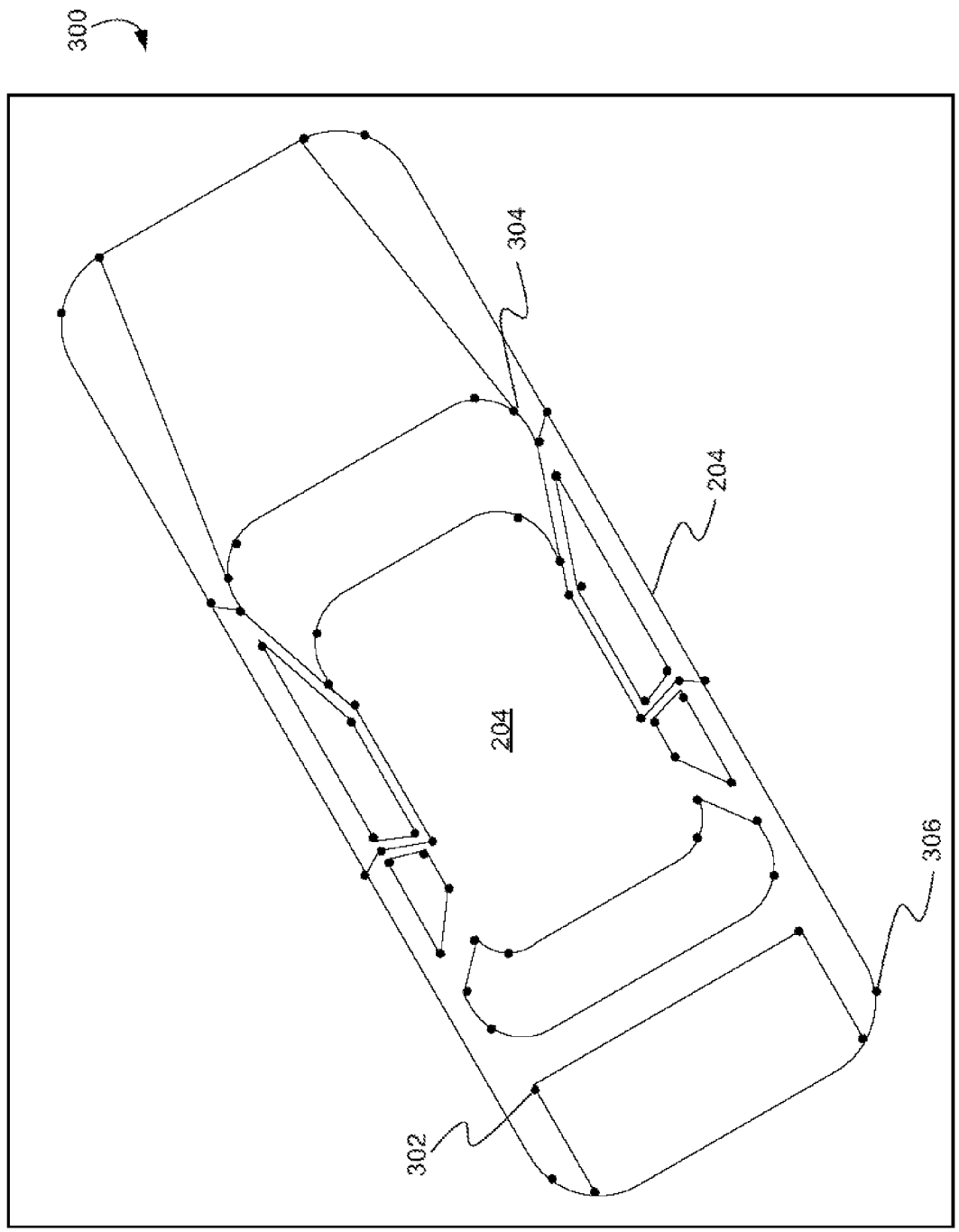
FIG. 3 illustrates an example method for selecting points of interest for tracking an object from frame to frame in a video.

FIG. 3 illustrates an example method for selecting points of interest for tracking an object from frame to frame in a video. For example, area 300 illustrated in FIG. 3 can correspond to user-selected area 208 of FIG. 2. After the user has selected area 300, interest point selection logic 106 of FIG. 1 can select interest points in area 300 for tracking object 204. In some implementations, object tracker 104 can track objects from frame to frame by tracking individual points within the selected area 300. Object tracker 104 can match an interest point in an initial frame (e.g., frame 202) with a corresponding interest point in a subsequent frame using a well-known an optical flow algorithm (e.g., Lucas-Kanade Technique, Kanade-Lucas-Tomasi features tracker, Horn-Schunck method, Buxton-Buston method, etc.).

To improve the accuracy of the point matching generated by the optical flow algorithm, interest point selection logic 106 can select interest points in area 300 so that the optical flow is generated using the most significant interest points. For example, an interest point is a point in an image which has a well-defined position and can be robustly detected. An interest point can be a corner (e.g., corner 302) but it can also be, for example, an isolated point of local intensity maximum or minimum, an intersection (204), line endings, or a point on a curve (206) where the curvature is locally maximal.

In some implementations, interest point selection logic 106 can select interest points based on eigenvalues calculated for each pixel in an image or image area. For example, interest point selection logic 106 can calculate eigenvalues of the structure tensor matrix generated around each pixel in user-selected area 300 using well-known methods. For example, interest point selection logic 106 can calculate two eigenvalues ($X_1$, $X_2$) for each pixel that represent the change in intensity of the pixel in two directions (e.g., north-south, east-west). The larger the eigenvalue, the greater the intensity change, for example. Thus, based on the magnitude of the eigenvalues, interest point selection logic 106 can determine whether the pixel corresponds to an interest point. For example, if $\lambda_1$ is near zero and $\lambda_2$ is near zero, then the pixel has no features of interest (e.g., is not an interest point). If $\lambda_1$ (or $\lambda_2$) is near zero and $\lambda_2$ (or $\lambda_1$) has some large positive value, then the pixel corresponds to an edge feature in the image (e.g., is not an interest point). If both $\lambda_1$ and $\lambda_2$ have large positive values, then the pixel corresponds to a corner feature in the image which can serve as an interest point for tracking object 204 from frame 202 to the next frame in the video.

In some implementations, interest point selection logic 106 can use the minimum of $\lambda_1$ and $\lambda_2$ to identify interest points in area 208. For example, if the minimum value between $\lambda_1$ and $\lambda_2$ is near zero, then the pixel has no feature or the pixel corresponds to an edge feature. If the minimum value between $\lambda_1$ and $\lambda_2$ is some large positive number, then the pixel corresponds to a corner feature. Thus, interest point selection logic 106 can use a single eigenvalue corresponding to the minimum of $\lambda_1$ and $\lambda_2$ to determine whether the pixel corresponds to an interest point. For example, interest point selection logic 106 can determine that a pixel corresponds to an interest point when the minimum eigenvalue for the pixel is above a minimum threshold value.

In some implementations, interest point selection logic 106 can use the minimum eigenvalue calculated for an interest point to compare one interest point to another interest point to determine which interest point has the most interesting features. For example, an interest point having a minimum eigenvalue of 0.0018 will be less interesting than an interest point having a minimum eigenvalue of 0.0024. The interest point with the larger minimum eigenvalue can provide better tracking results when tracking an interest point (e.g., and consequently the object) from one frame to the next. The black dots overlaid on object 204 (e.g., the car) represent some of the interest points having the most interesting features in area 300. These interest points can be some of the interest points used to track object 204 from frame to frame, for example. Once the interest points are selected, interest point selection logic 106 can send the selected interest points to interest point selection filter 108 of FIG. 1.

Adjusting Image to Improve Interest Point Selection

In some implementations, object tracker 104 can adjust the color values of the background of a frame. For example, if the object that the user wishes to track has similar color characteristics and/or texture as the background surrounding the object, object tracker 104 may not be able to determine interest points for tracking the object. For example, if the object is a smooth light green sign and the background behind the sign is textured and dark green, the color similarity between the green sign and the green background and the texture of the background may obscure the features and/or textures of the sign in the frame. For example, more interest points will be selected from the background than from the object to be tracked. Thus, in some implementations, object tracker 104 can preprocess a frame before performing interest point selection to cause a foreground object (e.g., the object to be tracked) to stand out from the background of the frame. For example, object tracker 104 can detect a solid color (e.g., the roof of the car, the area of a sign, etc.)) in user-selected area 208. After detecting the solid color, object tracker 104 can deemphasize everything in area 208 that is not the detected solid color. For example, object tracker 104 can deemphasize other portions of the image in the frame by adjusting pixel color values so that the detected solid color stands out and so that the textured background is deemphasized. After adjusting the image in the frame, object tracker 104 can perform the interest point selection process described above.

Filtering Interest Points

Figure 4:
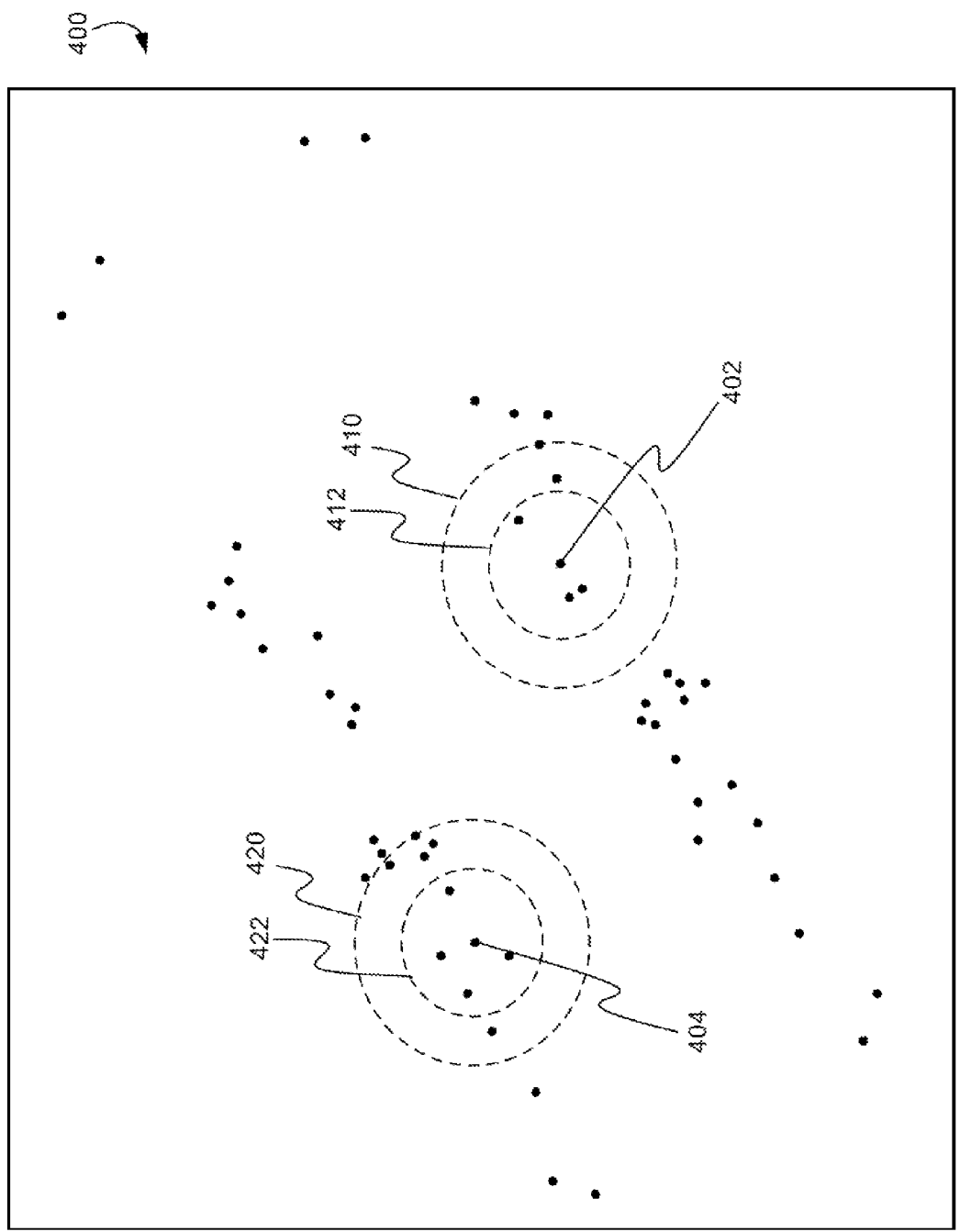
FIG. 4 illustrates an example method for filtering interest points.

FIG. 4 illustrates an example method for filtering interest points. For example, image area 400 can correspond to image area 300 of FIG. 3. Image area 400 is represented without object 204 to highlight the interest points when discussing interest point filtering, as follows. In some implementations, object tracker 104 can include interest point filter 108. For example, interest point filter 108 can filter interest points based on the minimum eigenvalue ($\lambda_{min}$) for the each interest point so that interest point tracking logic 110 can use the remaining interest points having the highest average eigenvalue to generate the optical flow and find matching interest points is subsequent frames. In the description below, the eigenvalue for an interest point is the minimum eigenvalue for an interest point (or pixel) described above.

In some implementations, interest point filter 108 can filter interest points based on the eigenvalue for an interest point using a double-pass non-maximum suppression method. For example, non-maximum suppression (NMS) is a method that finds the local maximum in a predefined neighborhood surrounding an interest point (or pixel). While the standard (e.g., single pass) non-maximum suppression method uses a single radius (R) to determine the suppression area (e.g., neighborhood), the double pass non-maximum suppression method uses two radii (R, r) in a first pass through the interest points and a single radius (R) in the second pass through the interest points.

Referring to FIG. 4, interest point selection logic 106 can identify interest points within user-selected area 400 based on the eigenvalues for each interest point, as described above. To filter the interest points, interest point filter 108 can add each interest point and corresponding eigenvalue (e.g., interest point 402, interest point 404, etc.) to a first pass interest point collection (e.g., array, list, etc.). Interest point filter 108 can sort interest points in the first pass interest point collection based on the corresponding eigenvalues. For example, the interest points in the first pass interest point collection can be sorted in descending order from highest eigenvalue to lowest eigenvalue.

After the interests are sorted, interest point filter 108 can select the interest point having the highest eigenvalue for processing by the double pass non-maximum suppression method. For example, the first interest point (e.g., interest point 402) in the first pass interest point collection can correspond to the interest point having the highest eigenvalue. After interest point 402 is selected by interest point filter 108, interest point filter 108 can determine two circular areas around interest point 402 defined by a big radius 410 ('R') and a small radius 412 ('r'). For example, the radii 'R' and 'r' can be dynamically adjusted by interest point filter 108 to generate at least a minimum number of interest points. The radii 'R' and 'r' can be dynamically adjusted by interest point filter 108 to generate less than a maximum number of interest points. For example, a smaller radius can generate more interest points, while a larger radius can generate fewer interest points.

In some implementations, after the areas defined by big radius 410 and small radius 412 are determined, interest point filter 108 can delete all interest points within small radius 412 from the first pass interest point collection. Interest point filter 108 can move interest points that lie outside of small radius 412 and within big radius 410 from the first pass interest point collection to a second pass interest point collection. Interest point filter 108 can move the selected interest point (e.g., interest point 402) from the first pass interest point collection to an optical flow interest point collection. For example, the optical flow interest point collection can include interest points that will be used to determine the optical flow from frame 202 to the next frame in the video.

In some implementations, after interest point filter 108 has moved the selected interest point (e.g., interest point 402) to the optical flow interest point collection, interest point filter 108 can select the next interest point (e.g., interest point 404) with the highest eigenvalue in the first pass interest point collection and delete or move interest points based on big radius 420 and small radius 422, as described above. Interest point filter 108 can continue to delete and move interest points in the first pass interest point collection as described above until no interest points remain in the first pass interest point collection.

In some implementations, after interest point filter 108 determines that there are no more interest points remaining in the first pass interest point collection, interest point filter 108 can delete interest points in the second pass interest point collection based on big radius 'a' in a similar way as the interest points in the first pass interest point collection, described above. For example, when processing the interest points in the second pass interest point collection, interest point filter 108 can select the interest point in the second pass interest point collection that has the highest eigenvalue. interest point filter 108 can determine an area around the selected interest point based on the big radius 'a'. Interest point filter 108 can delete all interest points in the second pass interest point collection that fall within the big radius 'R' and move the selected interest point to the optical flow interest point collection. For example, interest point filter 108 can use a single radius 'R' when processing the interest points in the second pass interest point collection rather than the two radii (e.g., 'R', 'r') used to process the interest points in the first pass interest point collection, described above.

Figure 5:
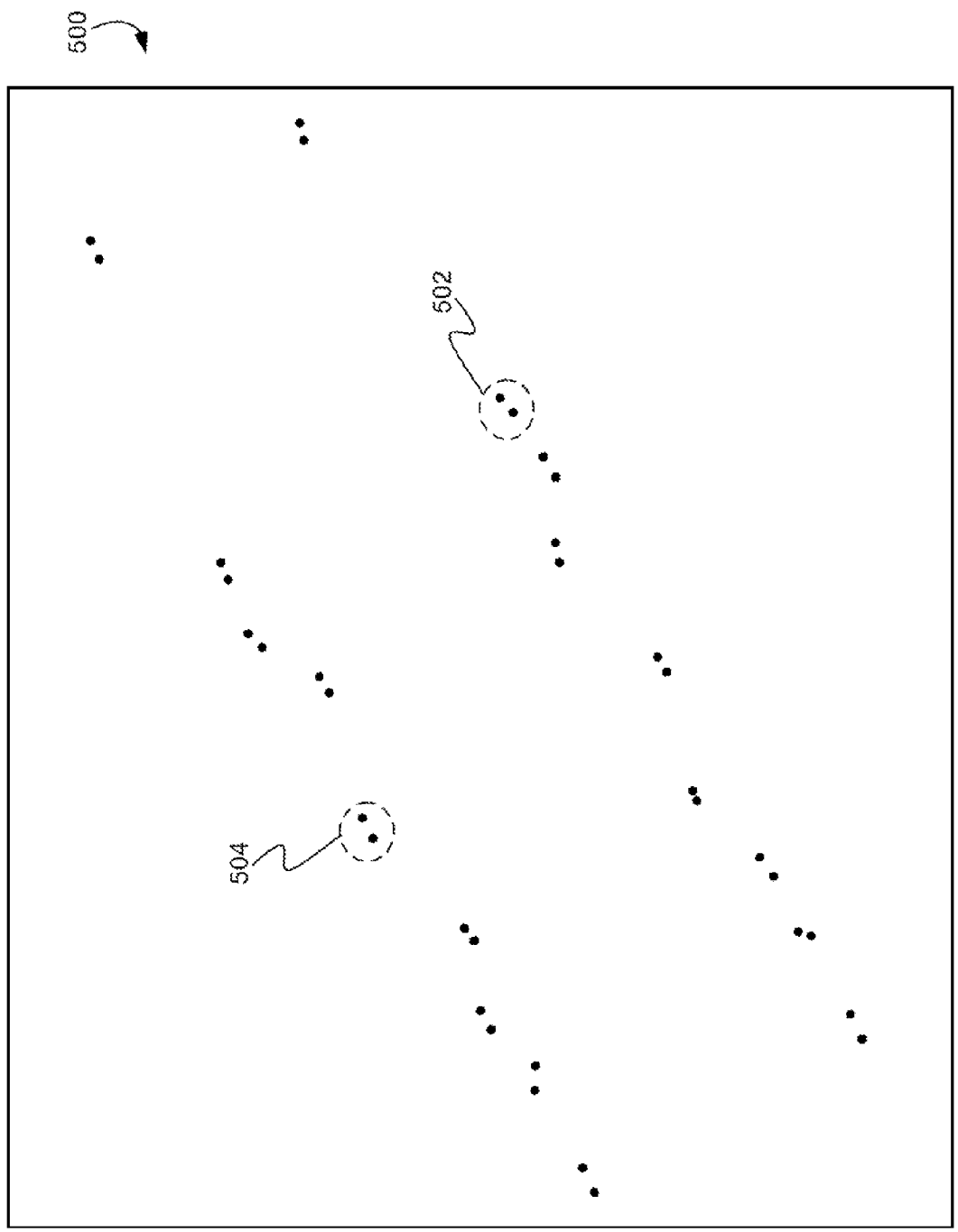
FIG. 5 illustrates an example of interest points resulting from the double pass non-maximum suppression method.

FIG. 5 illustrates an example of interest points resulting from the double pass non-maximum suppression method. For example, image area 500 can correspond to image area 400 of FIG. 4. For example, the number of interest points remaining after the double non-maximum suppression method can be greater than the number of interest points remaining after the standard single pass non-maximum suppression method. Moreover, the average eigenvalue for the remaining interest points after performing the double non-maximum suppression method is often higher than the standard single pass non-maximum suppression method. Since a bigger eigenvalue means stronger texture around the interest points and stronger texture will result in more accurate tracking, the double pass non-maximum suppression method can result in more accurate tracking from frame to frame. Additionally, the double pass non-maximum suppression method generate interest point pairs (e.g., interest point pair 502, interest point pair 504) that can improve the tracking reliability when deriving the global transform used for tracking the user-selected object 204.

Tracking Interest Points

FIG. 6 illustrates an example optical flow method for tracking interest points from a first frame to a second frame. For example, object tracker 104 can include interest point tracking logic 110. Interest point tracking logic 110 can be configured to track the interest points remaining (e.g., the interest points in the optical flow interest point collection) after filtering the interest points using the double pass non-maximum suppression method, described above. For example, frame 600 can correspond to frame 202 (e.g., at time 't') of FIG. 2. Frame 650 can correspond to the next frame in the video (e.g., at time 't+1'). Interest point tracking logic 110 can match an interest point (e.g., interest point 602) in frame 600 with a matching point (e.g., point 652) in frame 650 using a well-known optical flow algorithm (e.g., Lucas-Kanade Technique, Kanade-Lucas-Tomasi features tracker, Horn-Schunck method, Buxton-Buston method, etc.). After interest point tracking logic 110 predicts a matching point (e.g., point 652 in frame 650) for a corresponding interest point (e.g., interest point 602 in frame 600), matching pair pruning logic 120 can determine if interest point 602 and point 652 are correctly matched (e.g., a matching pair) using the matching pair pruning methods below.

Matching Pair Pruning

In some implementations, matching pair pruning logic 120 can determine if the interest points in frame 600 are correctly matched to the corresponding points in frame 650 predicted by the optical flow algorithm. For example, object tracker 104 can include matching pair pruning logic 120. For example, after the optical flow algorithm determines or predicts points (e.g., point 652) in frame 650 that correspond to interest points (e.g., interest point 602) in frame 600, matching pair pruning logic 120 can check the matching point pairs to determine if the pair of points is actually a match. Matching pair pruning logic 120 can, for example, perform a forward-backward check, a histogram of oriented gradients (HoG) check, and/or a clustering check to determine whether the optical flow algorithm has correctly determined the matching pairs of points in frame 600 and frame 650. For example, a pair of points are correctly matched when predicted point 652 of frame 650 corresponds to the same location on the tracked object (e.g., object 204) as interest point 602 of frame 600.

Forward-Backward Check

FIG. 7 illustrates an example of the forward-backward check for determining the correctness of matching point pairs. For example, matching pair pruning logic 120 can include forward-backward logic 122 for performing the forward-backward check. In some implementations, forward-backward logic 122 can perform a forward-backward check to determine whether a matched pair of points in consecutive frames is correctly matched. For example, forward-backward logic 122 can obtain a list of matching point pairs from interest point tracking logic 110 described above. The list can include a predicted point (e.g., matching point, corresponding point, etc.) in frame 650 for every interest point in frame 600 tracked by interest point tracking logic 110 (e.g., the forward prediction). For each predicted point in the list (e.g., points in frame 650), object tracker 104 can use the same optical flow algorithm as interest point tracking logic 110 to track the predicted points back to frame 600 (e.g., the backward prediction).

For example, interest point 702 in frame 600 can be matched (e.g., tracked) to point 704 in frame 650 by the optical flow algorithm. However, point 704 may not be the correct match for interest point 702. For example, the correct matching point for interest point 702 may be obscured in frame 650 which can cause the optical flow algorithm to predict an incorrect point (e.g., point 704) in frame 650 as the matching point for interest point 702 when predicting the best match for each interest point in frame 600. Forward-backward logic 122 can detect the error in the matching point pair by performing a backward prediction using the same optical flow algorithm as interest point tracking logic 110 to predict a point (e.g. point 706) in frame 600 that matches the predicted point 704 in frame 650. For example, the optical flow algorithm can predict that the matching point in frame 600 for the predicted point 704 is point 706. In this case, the point in frame 600 corresponding to the predicted point 704 in frame 650 is not obscured so the optical flow algorithm has predicted the correct matching point.

To detect the error in the pairing of interest point 702 in frame 600 to predicted point 704 in frame 650, forward-backward logic 122 can calculate the distance between interest point 702 and the backward predicted point 706. For example, the distance can be calculated by determining the difference in coordinates (e.g., x,y image pixel coordinates) of interest point 702 and backward predicted point 706 using well-known techniques. Forward-backward logic 122 can determine that interest point 702 in frame 600 was incorrectly (e.g., erroneously) matched to predicted point 704 in frame 650 when the distance between interest point 702 and backward predicted point 706 is greater than a threshold value (e.g., 6 pixels). When forward-backward logic 122 determines that a pair of points in frames 600 and 650 are incorrectly matched by the optical flow algorithm, forward-backward logic 122 can remove the pair of points from the list of matching point pairs. When a pair of points in frames 600 and 650 matched by interest point tracking logic 110 pass the forward-backward check (e.g., no error was found), then the pair of points can be checked by histogram of oriented gradients logic 124.

Histogram of Oriented Gradients Check

Figure 8:
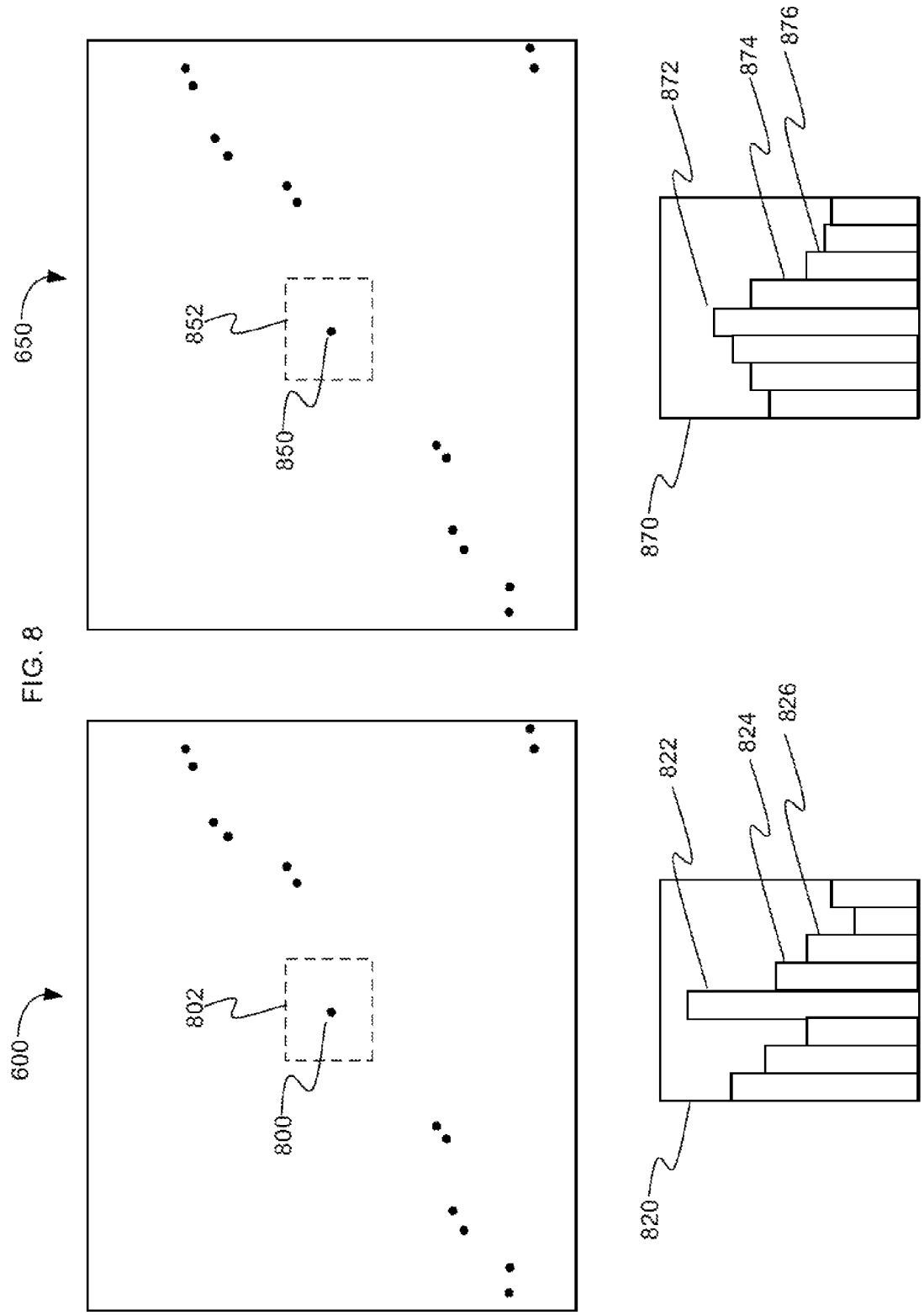
FIG. 8 illustrates an example of the histogram of oriented gradients check for determining the correctness of matching point pairs.

FIG. 8 illustrates an example of the histogram of oriented gradients check for determining the correctness of matching point pairs. In some implementations, object tracker 104 can include histogram of oriented gradients (HOG) logic 124 to perform the histogram of oriented gradients check on the matching point pairs remaining in the list of matching point pairs after the forward-backward check is performed by forward-backward logic 122. For example, even if a matching pair of points passes the forward-backward check described above, the matching pair of points may not be a correct match.

In some implementations, HOG logic 124 can perform histogram of oriented gradients pattern matching to determine whether interest point 800 in frame 600 actually matches predicted point 850 of frame 650. For example, the pair of interest point 800 and predicted point 850 may have previously passed the forward-backward check described above. To perform the histogram of oriented gradients check, HOG logic 124 can define a patch (e.g., image area 802) around interest point 800 and a patch (e.g., image area 852) around predicted point 850. HOG logic 124 can compare the patches (e.g., image area 802, image area 852) using the histogram of oriented gradients descriptors.

Histogram of oriented gradient (HOG) descriptors are feature descriptors used in computer vision and image processing for the purpose of object detection. For example, the technique counts occurrences of gradient orientation in localized portions of an image. The HOG descriptors can be used for classification and object recognition. For example, object appearance and shape within an image can be described by the distribution of intensity gradients or edge directions. The HOG descriptors can represent the distribution of intensity gradients or edge directions.

In some implementations, HOG logic 124 can generate the HOG descriptors by dividing an image into small connected regions called cells and for each cell compiling a histogram of gradient directions or edge orientations for the pixels within the cell. The combination of these histograms represents the descriptor. For improved performance, HOG logic 124 can contrast-normalize the local histograms by calculating a measure of the intensity across a larger region of the image (e.g., a block) and then using this value to normalize all cells within the block. This normalization can result in better invariance to changes in illumination or shadowing.

In some implementations, to generate the HOG descriptors, HOG logic 124 can calculate gradient values for each pixel in image areas 802 and 852. For example, for a greyscale image, HOG logic 124 can apply a one-dimensional centered point discrete derivative mask in both the horizontal (x) and vertical (y) directions. For example, object tracker 104 can filter the image areas using the following filter kernels:

$$D_x = [-1 \quad 0 \quad 1], \text{ and } D_y = \begin{bmatrix} 1 \\ 0 \\ -1 \end{bmatrix}.$$

The x and y derivatives can be obtained using a convolution operation on each pixel in image areas 802 and 852. For example, given an image area I, the convolution operation can be $I_x=I*D_x$, and $I_y=I*D_y$. The magnitude of the gradient can be calculated by $|G|=\sqrt{I_x^2+I_y^2}$. The orientation of the gradient can be calculated by $$\theta = \arctan\frac{I_x}{I_y}.$$

In some implementations, HOG logic 124 can generate cell histograms (e.g., histogram 820, histogram 870) based on the gradient magnitude and gradient orientation for each cell in image areas 802 and 852. For example, each pixel within a cell casts a weighted vote for an orientation-based histogram bin (e.g., bins 822, 824, 826, 872, 874, 876, etc.) based on the values found in the gradient computation. The cells can be rectangular and the histogram bins can be evenly spread over a range of orientations (e.g., 0 to 180 degrees or 0 to 360 degrees, depending on whether the gradient is "unsigned" or "signed"). For example, each histogram bin can represent a sub-range of orientations (e.g., 0-10, 11-20, etc.) depending on the number of bins over the orientation range. The vote weight per pixel can correspond to the gradient magnitude, the square root of the gradient magnitude, or square of the gradient magnitude, for example.

In some implementations, HOG logic 124 can assign pixels to histogram bins using fuzzy logic. For example, HOG logic 124 can perform a kernel density estimation followed by point sampling to assign the smoothed value back to respective histogram bins. In some implementations, pixel membership can be normalized across adjacent bins using a Gaussian distribution function. For example, assuming a pixel at $(x_i, y_i)$ has a gradient orientation '$a_i$' and its Gaussian kernel falls within a bin 'p' centered at '$p_c$', the pixel's weighted vote 'v' (e.g., gradient magnitude) can be shared among adjacent bins 'k', 'k+1', and 'k−1' (e.g., bins 822, 824, 826, and bins 872, 874, 876, etc.) according to the following:

$$v_p = \exp\left(-\frac{(a_i - p_c)^2}{w*\sigma^2}\right),$$

where 'σ' is a value representing half the bin size, 'w' is the normalization factor, 'p' is a bin 'k−1', 'k', or 'k+1', and '$v_p$' is the vote assigned to bins 'k−1', 'k', or 'k+1'.

In some implementations, after HOG logic 124 generates histograms for each cell in the image areas, HOG logic 124 can generate descriptor blocks for the image areas. For example, HOG logic 124 can generate descriptor blocks for the cells in image areas 802 and 852. In some implementations, the gradient strengths can be locally normalized to account for changes in illumination and contrast in image areas 802 and 852. For example, HOG logic 124 can group the cells in an image area into larger, spatially connected blocks. The HOG descriptor can be the vector of the components of the normalized cell histograms from all of the block regions. For example, the blocks can overlap such that each cell contributes more than once to the final descriptor. In some implementations, the HOG descriptors an image area can be normalized In some implementations, HOG logic 124 can normalize the blocks within an image area. For example, there are different methods for block normalization. For example, if v is the non-normalized vector containing all histograms in a given block, $\|v_k\|$ is the vector's k-norm for k=1,2, and e is some small constant (e.g., whose value will not influence the results), then the normalization factor can be one of the following:

$$f = \frac{v}{\sqrt{\|v\|_2^2 + e^2}}, f = \frac{v}{\sqrt{\|v\|_1 + e}}, \text{ or } f = \sqrt{\frac{v}{\|v\|_1 + e}}.$$

In some implementations, HOG logic 124 can compare the similarity of two HOG descriptor vectors to determine whether an interest point in one frame matches a predicted point in a subsequent frame. For example, after HOG logic 124 generates a HOG descriptor vector for image area 802 and a HOG descriptor vector for image area 852, HOG logic 124 can compare the HOG descriptor vectors to determine how similar image area 852 is to image area 802.

In some implementations, HOG logic 124 can compare the HOG descriptor vectors using a Euclidean distance metric. For example, if the distance metric is less than a threshold value, HOG logic 124 can determine that image area 852 is similar to image area 802. In some implementations, HOG logic 124 can compare HOG descriptor vectors using a cosine similarity metric. Cosine similarity is a measure of similarity between two vectors of 'n' dimensions by finding the cosine of the angle between them. For example, if the cosine is greater than a threshold value (e.g., 0.7), HOG logic 124 can determine that image area 852 is similar to image area 802.

In some implementations, HOG logic 124 can determine that interest point 800 in frame 600 matches predicted point 852 in frame 650 when image area 852 is similar to image area 802. HOG logic 124 can determine that interest point 800 in frame 600 does not match predicted point 852 in frame 650 when image area 852 is not similar to image area 802. When HOG logic 124 determines that interest point 800 does not match interest point 852, the interest point pair (800:852) can be removed from the list of matching point pairs.

Clustering Check

FIG. 9 illustrates an example of a point clustering check for determining the correctness of matching point pairs. For example, object tracker 104 can include clustering logic 126 for performing the clustering check on the matching point pairs remaining in the list of matching point pairs after the histogram of oriented gradients check is performed. For example, the clustering check can remove matching point pairs that do not correspond to the object being tracked. For example, a matching point pair that corresponds to a background location should be removed from the list of matching point pairs used to track the user-selected object.

In some implementations, clustering logic 126 can remove a matching point pair based the distance shifted between frames for each of the matching point pairs (e.g., interest point-predicted point pairs). For example, clustering logic 126 can determine the distance (d) by calculating the distance between the interest point $(x_i, y_i)$ and the predicted point $(x_p, y_p)$ (e.g., $d=\sqrt{(x_i-x_p)^2+(y_i-y_p)^2}$). If the distance shifted for matching point pair 904 is not similar to the distance shifted by other matching point pairs 906, then matching point pair 904 (e.g., is an outlier pair) probably corresponds to a background location and does not correspond to the object being tracked. For example, the background of an image or frame can correspond to areas of an image that do not correspond to the object being tracked. As illustrated by FIG. 9, the matching point pairs 906 have shifted right from frame 600 to frame 650 with the object being tracked while matching point pair 904 has remained stationary (e.g., has shifted left relative to matching point pairs 906). Since matching point pair 904 is not shifting with the object being tracked (as illustrated by matching point pairs 906), clustering logic 126 can remove matching point pair 904 from the list of matching point pairs.

In some implementations, clustering logic 126 can remove outlier matching point pairs from the list of matching point pairs using k-means clustering. For example, for each matching point pair, clustering logic 126 can calculate the translation vector $t_m[x_i-x_p, y_i-y_p]$ and generate the two-dimensional array $T=\{t_m\}$, where m=1:n and 'n' is the number of good matching pairs remaining in the list of matching point pairs. Clustering logic 126 can sort the array 'T' and pick three numbers from the sorted array as the initial means for the k-means clusters. For example, clustering logic 126 can select three initial means for clustering. The three means can be the first element in 'T' ($t_o$), the middle element in 'T' ($t_m$), and the last element in 'T' ($t_e$). Clustering logic 126 can perform k-mean clustering on the array 'T' using the first, middle, and last elements in 'T' as the cluster centers. Clustering logic 126 can merge the clusters, if possible, and keep only the matching pairs that belong to the biggest cluster. For example, clustering logic 126 can remove the matching pairs that belong to the smaller cluster(s) from the list of matching point pairs. For example, clustering logic 126 can remove the matching point pairs that belong to the background from the list of matching point pairs. Clustering logic 126 can remove outlier matching point pairs that are inconsistent with other matching point pairs but that still pass the forward-backward check and the HOG check, for example.

Tracking the Object

In some implementations, global transform logic 128 can determine a global transformation matrix which maps the interest points in frame 600 to corresponding predicted points in frame 650. For example, object tracker 104 can include global transform logic 128. In some implementations, global transform logic 128 can find a transformation matrix which maps the greatest number of point pairs between the two frames. For example, global transform logic 128 can use a well-known RANSAC (Random Sample Consensus) algorithm to exclude point pair outliers and to determine the transformation matrix. For example, global transform logic 128 can provide the matching point pairs remaining in the list of matching point pairs (e.g., after performing matching pair pruning above) as input to the transformation algorithm (e.g., RANSAC). The transformation algorithm can generate a transformation matrix based on the list of matching point pairs. Global transform logic 128 can use the transformation matrix to track the user-selected object from frame 600 to frame 650. For example, global transform logic 128 can track the user-selected object by using the transformation matrix to match a group of points on the user-selected object in frame 600 to a corresponding group of points on a corresponding object in frame 650.

Tracking Confidence

In some implementations, tracking confidence logic 130 can generate tracking confidence metric when tracking an object from frame to frame. For example, object tracker 104 of FIG. 1 can include tracking confidence logic 130. In some implementations, tracking confidence logic 130 can model the behavior of interest points from frame to frame to detect anomalous tracking behavior. To generate the confidence metric, tracking confidence logic 130 can calculate the projection error for each matching point pair in frame 650 using the global transform. For example, the projection error for a matching pair can be the distance between the location of the predicted point (e.g., as determined using optical flow) in frame 650 corresponding to an interest point and the location of the actual corresponding point (e.g., as determined using the transformation matrix) in frame 650. Tracking confidence logic 130 can model the average projection error for a frame 'ef(t)' (e.g., frame 650) using a Gaussian distribution. For example, tracking confidence logic 130 can use the projection error for each matching pair within frame 650 to model the average projection error for the entire frame 650 using a Gaussean distribution. Tracking confidence logic 130 can calculate the confidence value 'c' by comparing the projection error variance for the current frame (e.g., frame 650) to the projection error variance for all frames up to the current frame. For example, tracking confidence logic 130 can calculate the confidence value using the following equation:

$$c = \exp\left(\frac{-(ef(t) - \text{mean} f(t-1))^2}{\text{var} f(t-1)^2 * w}\right),$$

where meanf(t−1) is the mean projection error for all frames up to the current frame (t) and varf(t−1) is the variance up to the current frame (t) and 'w' is some predetermined weight value.

In some implementations, object tracker 104 can continue tracking the user-selected object described above from frame to frame while the confidence value is above a confidence threshold value. For example, when object tracker 104 has successfully tracked the user-selected object from frame 't' to frame 't+1', object tracker can continue tracking the user-selected object from frame 't+1' to frame 't+2' using the processes described above. For example, interest point selection logic 106 can select new interest points in frame 't+1' to track the user selected object to frame 't+2'. In some implementations, the confidence threshold value can be dynamically determined based on the Gaussean distribution of the projection error. For example, the confidence threshold can be set to a confidence error value representing two standard deviations from the average confidence error value. If the confidence value drops below the confidence threshold value, object tracker 104 can self-correct, as described below.

Self-Correction

In some implementations, object detection logic 132 can reacquire the user-selected object when the tracking confidence value drops below a confidence threshold value. For example, object tracker 104 can include object detection logic 132. If the confidence value drops below the confidence threshold value, object tracker 104 can determine that object tracker 104 has lost the object (e.g., object tracker 104 is no longer tracking the object). When object tracker 104 has determined that object tracker 104 has lost the object, object detection logic 132 can perform object detection using, for example, a standard SIFT (scale invariant feature transform) descriptor for the user-selected object. For example, object recognition based on the SIFT descriptor can be performed using Lowe's algorithm.

Graphical User Interface

Figure 10:
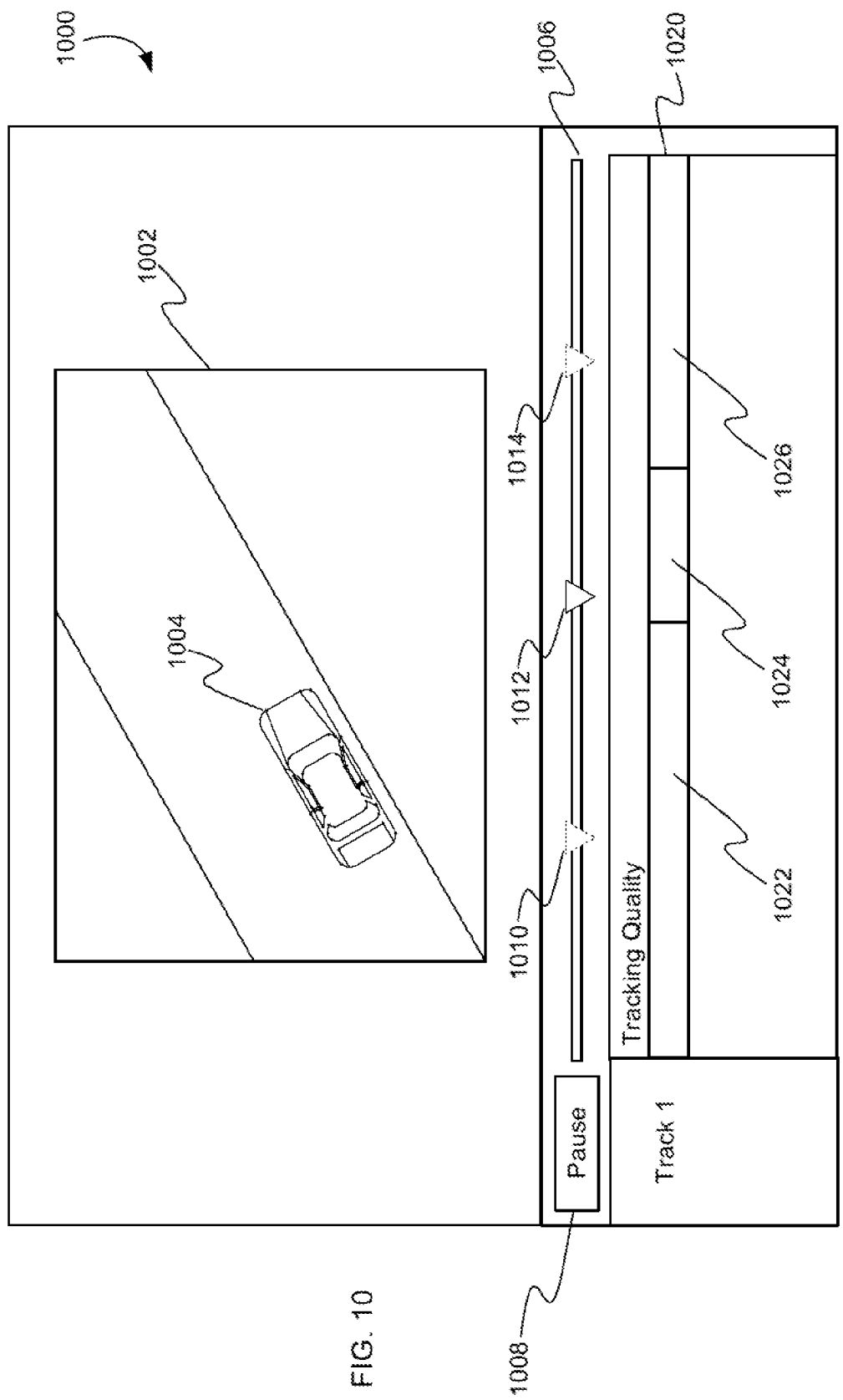
FIG. 10 illustrates an example graphical user interface for presenting object tracking results.

FIG. 10 illustrates an example graphical user interface 1000 for presenting object tracking results. For example, graphical user interface (GUI) 1000 can be presented on a display of computing device 100 that implements object tracker 104 described above. GUI 1000 can be a user interface of object tracker 104, for example.

In some implementations, a user can interact with video 1002 presented on GUI 1000 to select object 1004 for tracking. Video 1002 can be played back to the user from start to finish. Video 1002 can be presented frame-by-frame. For example, the user can navigate to a frame of video 1002 that presents object 1004 (e.g., a car, person, pet, or other foreground object) by manipulating graphical element 1006 (e.g., a slider bar, a video timeline, etc.).

In some implementations, the user can draw line circumscribing object 1004 to identify object 1004 as the object to be tracked by object tracker 104. For example, most of existing tracking methods will fail quickly if some background is included at the initialization. The existing trackers work best when the user closely traces the boundary of the object to be tracked or when the user draws inside the object. Tracing an object is very tedious, and drawing inside an object may cause the object tracker to miss important object interest points (e.g., corners) along the boundary of the object. However, because of clustering logic 126 which removes interest points that correspond to background locations in an image, users of object tracker 104 do not have to draw the line tightly around the object to track. This flexibility in specifying the tracked object provides for a much more user-friendly interface for specifying objects to track than previous tracking methods.

In some implementations, the user can select graphical element 1008 to cause object tracker 104 to track object 1004 through video 1002. For example, graphical element 1008 can be a button that the user can select to start and pause playback of video 1002 and tracking of object 1004. Object tracker 104 can track object 1004 frame-by-frame through video 1002 using the object tracking methods and algorithms described above when the user causes object tracker 104 to start tracking object 1004 by selecting graphical element 1008.

In some implementations, GUI 1000 can present a graphical indication of the quality of the object tracking. For example, GUI 1000 can include graphical element 1020 that presents a color representation of the object tracking confidence value (e.g., tracking quality value) calculated for each frame. As video 1002 is played back and object 1004 is tracked, a current position indicator (e.g., 1010, 1012, 1014) can move along the video timeline represented by graphical element 1006. At any position along the video timeline, graphical element 1020 can change color (e.g., green, red, etc.) to indicate the tracking confidence.

For example, if the tracking confidence value is above the confidence threshold value, object 1004 is being successfully tracked by object tracker 104 and the portion (e.g., portion 1010) of graphical element 1020 corresponding to the time (e.g., 1010) when object 1004 is successfully being tracked can be colored green. When the tracking confidence value is below the confidence threshold value, object 1004 is not being successfully tracked (e.g., has been lost) by object tracker 104 and the portion (e.g., portion 1024) of graphical element 1020 corresponding to the time (e.g., 1012) when object 1004 is lost can be colored red. When object 1004 is reacquired (e.g., through the self-correction mechanism described above) and tracking is resumed, the portion (e.g., portion 1026) of graphical element 1006 corresponding to the time (e.g., 1014) when object 1004 is being tracked again can be colored green. Thus, GUI 1000 can provide a graphical representation of the tracking quality while tracking user-selected object 1004.

Example Process

Figure 11:
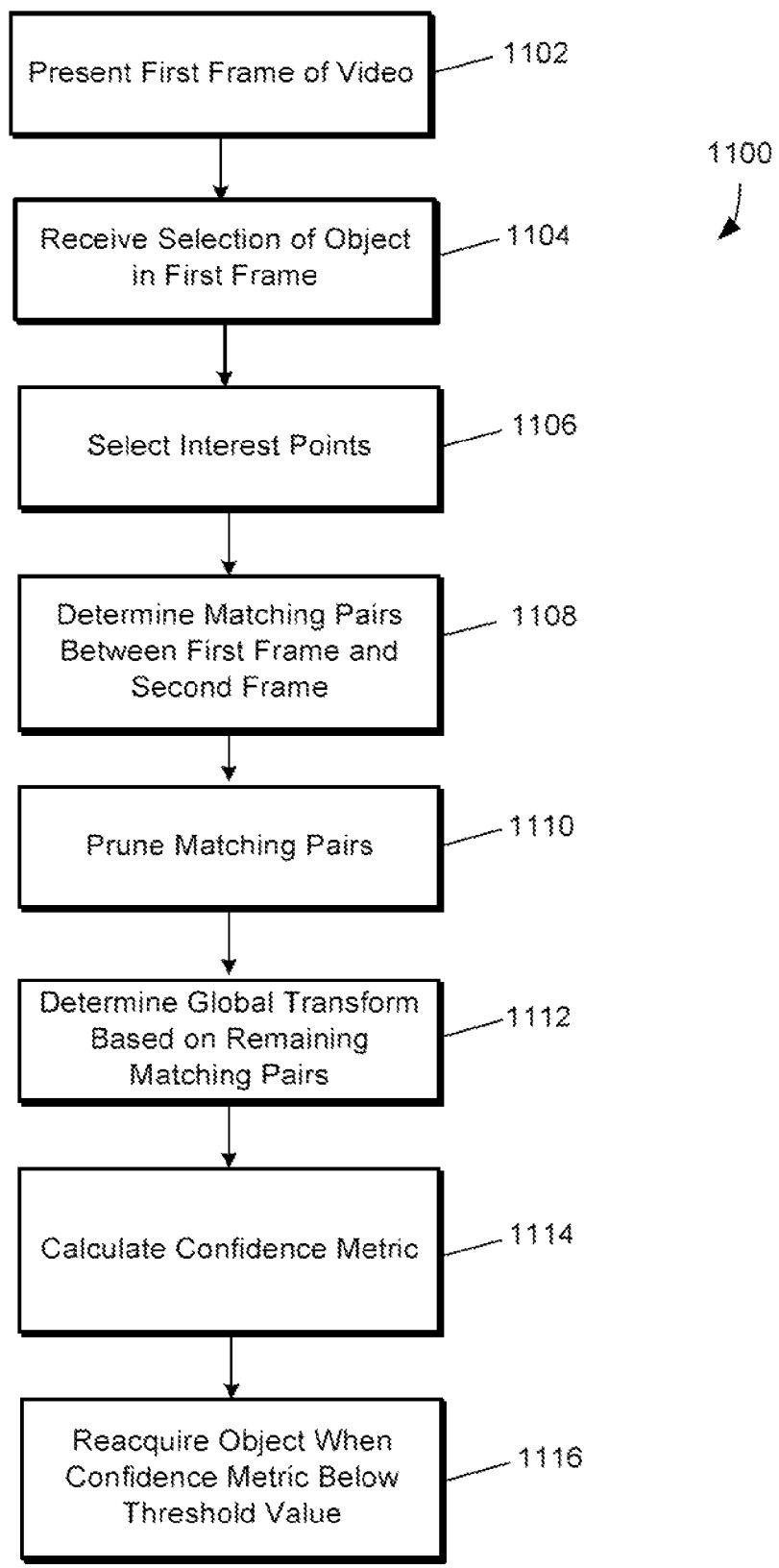
FIG. 11 is flow diagram of an example process for tracking objects in images.

FIG. 11 is flow diagram of an example process 1100 for tracking objects in images. For example, process 1100 can provide for an affine object tracker that can perform long term object tracking and that can handle object occlusion, object disappearance, and object re-detection.

At step 1102, computing device 100 can present a first frame of video. For example, computing device 100 can receive user input identifying a video to process for object tracking. Computing device 100 can present the video on a graphical user interface (e.g., GUI 200, GUI 1000). The user can navigate through the frames of the video to select a frame that includes an object to be tracked.

At step 1104, computing device 100 can receive a selection of an object in the first frame. For example, the user can select an object using a drawing tool to draw a line circumscribing the object to be tracked by computing device 100. The area inside the line will be processed to select points of interest used for tracking the object from one frame to the next.

At step 1106, computing device 100 can select interest points from within the user selected area for tracking the object. For example, computing device 100 can select interest points based on eigenvalues calculated for points within the user selected area. Computing device can filter the interest points based on the eigenvalues generated for the interest points using the double-pass non-maximum suppression method described above.

At step 1108, computing device 100 can determine matching pairs between the first frame and a second frame. For example, the first frame can be a frame at time 't' and the second frame (e.g., the next frame) can be a frame at time 't+1'. Computing device 100 can use an optical flow method to predict which point in frame 't+1' matches an interest point in frame 't'. These matched points are referred to as a matching point pair. Computing device 100 can generate a matching point pair for each interest point selected at step 1106.

At step 1110, computing device 100 can prune the matching point pairs. For example, computing device 100 can prune the matching point pairs using the forward-backward check, the histogram of oriented gradients check, and/or the clustering check described above.

At step 1112, computing device 100 can determine the global transform for the selected area based on the remaining matching point pairs. For example, computing device can determine the global transform matrix using the RANSAC method described above.

At step 1114, computing device 100 can calculate a confidence metric. For example, the confidence metric (e.g., confidence value) can be generated by determining the projection error for each interest point based on the global transform. The projection error can be modeled using a Gaussian distribution and the confidence metric can be a probability representing the likelihood that the projected (predicted) point in frame 't+1' corresponds to the interest point in frame 't'.

At step 1116, computing device 100 can reacquire the object when the confidence metric is below a threshold value. For example, computing device 100 can reacquire the user-selected object using well-known object recognition methods based on a SIFT descriptor of the object when the confidence metric (e.g., probability that the projected point matches the corresponding interest point) is above some threshold value (e.g., 0.7).

Example System Architecture

Figure 12:
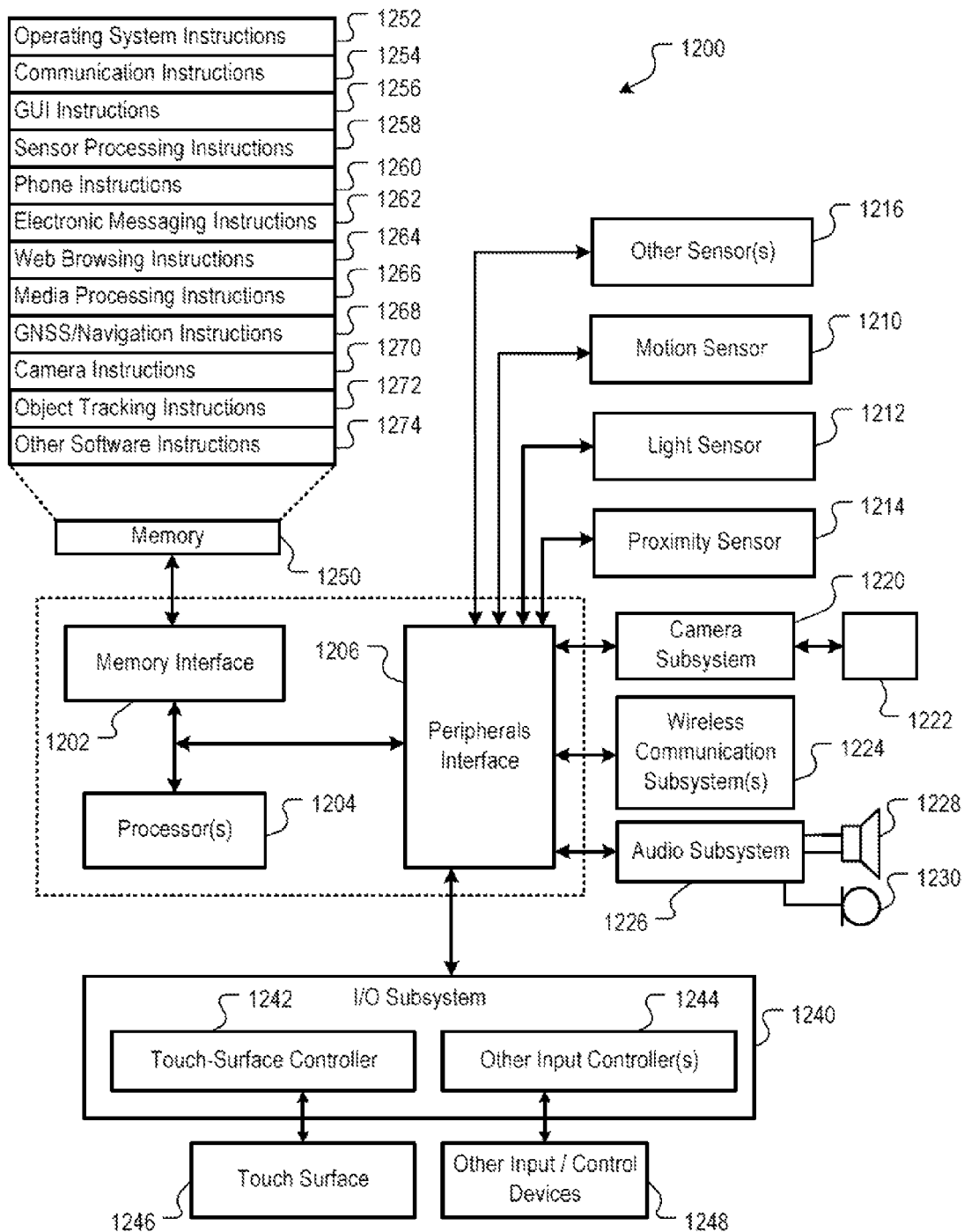
FIG. 12 is a block diagram of an example computing device that can implement the features and processes of FIGS. 1-11.

FIG. 12 is a block diagram of an example computing device 1200 that can implement the features and processes of FIGS. 1-11. The computing device 1200 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the computing device 1200 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate orientation, lighting, and proximity functions. Other sensors 1216 can also be connected to the peripherals interface 1206, such as a global navigation satellite system (GNSS) (e.g., GPS receiver), a temperature sensor, a biometric sensor, magnetometer or other sensing device, to facilitate related functionalities.

A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips. The camera subsystem 1220 and the optical sensor 1222 can be used to collect images of a user to be used during authentication of a user, e.g., by performing facial recognition analysis.

Communication functions can be facilitated through one or more wireless communication subsystems 1224, which can include radio frequency receivers and transmitters and/ or optical (e.g., infrared) receivers and transmitters. The specific design and implementation of the communication subsystem 1224 can depend on the communication network (s) over which the computing device 1200 is intended to operate. For example, the computing device 1200 can include communication subsystems 1224 designed to operate over a GSM network, a GPRS network, an EDGE network, a Wi-Fi or WiMax network, and a Bluetooth™ network. In particular, the wireless communication subsystems 1224 can include hosting protocols such that the device 100 can be configured as a base station for other wireless devices.

An audio subsystem 1226 can be coupled to a speaker 1228 and a microphone 1230 to facilitate voice-enabled functions, such as speaker recognition, voice replication, digital recording, and telephony functions. The audio subsystem 1226 can be configured to facilitate processing voice commands, voiceprinting and voice authentication, for example.

The I/O subsystem 1240 can include a touch-surface controller 1242 and/or other input controller(s) 1244. The touch-surface controller 1242 can be coupled to a touch surface 1246. The touch surface 1246 and touch-surface controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration can disengage a lock of the touch surface 1246; and a pressing of the button for a second duration that is longer than the first duration can turn power to the computing device 1200 on or off. Pressing the button for a third duration can activate a voice control, or voice command, module that enables the user to speak commands into the microphone 1230 to cause the device to execute the spoken command. The user can customize a functionality of one or more of the buttons. The touch surface 1246 can, for example, also be used to implement virtual or soft buttons and/or a keyboard.

In some implementations, the computing device 1200 can present recorded audio and/or video files, such as MP3, AAC, and MPEG files. In some implementations, the computing device 1200 can include the functionality of an MP3 player, such as an iPod™. The computing device 1200 can, therefore, include a 36-pin connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks.

The operating system 1252 can include instructions for handling basic system services and for performing hardware dependent tasks. In some implementations, the operating system 1252 can be a kernel (e.g., UNIX kernel). For example, operating system 1252 can implement the object tracking features as described with reference to FIGS. 1-11.

The memory 1250 can also store communication instructions 1254 to facilitate communicating with one or more additional devices, one or more computers and/or one or more servers. The memory 1250 can include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Navigation instructions 1268 to facilitate GNSS and navigation-related processes and instructions; and/or camera instructions 1270 to facilitate camera-related processes and functions.

The memory 1250 can store other software instructions 1272 to facilitate other processes and functions, such as the object tracking processes and functions as described with reference to FIGS. 1-11.

The memory 1250 can also store other software instructions 1274, such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the computing device 1200 can be implemented in hardware and/or in software, including in one or more signal processing and/or application specific integrated circuits.

What is claimed is:

1. A method comprising:
   one or more processors; and
   receiving, by a computing device, user input identifying an image area of a first frame of a video, the image area including an object to be tracked from the first frame to a second frame of the video by the computing device;
   selecting, by the computing device, interest points within the image area;
   filtering, by the computing device, the selected interest points using a non-maximum suppression filter;
   generating, by the computing device, matching point pairs based on the filtered interest points, where each point pair in the matching point pairs includes a first selected interest point in the first frame and a corresponding predicted point in the second frame, where the predicted point in the second frame is determined by tracking the particular interest point from the first frame to the corresponding predicted point in the second frame;
   pruning, by the computing device, one or more point pairs in the matching point pairs by clustering the matching point pairs and removing matching point pairs that do not belong to a cluster having a largest number of matching point pairs;
   and tracking, by the computing device, the object in the first frame to the second frame based on the interest points in the matching point pairs that belong to the largest matching point pair cluster;
   wherein the non-maximum suppression filter is a double-pass non-maximum suppression filter that uses two concentric radii to filter interest points on a first pass through the selected interest points and a single radius to filter interest points on a second pass through the selected interest points.

2. The method of claim 1, wherein the pruning comprises:
   determining a distance between the interest point and the corresponding predicted point in each of the corresponding pairs in the matching point pairs; and
   clustering the matching point pairs by performing k-means clustering based on distances corresponding to each matching point pair to generate two or more clusters of matching point pairs.

3. The method of claim 1, further comprising:
   generating a global transformation matrix which maps the interest points in the first frame that are included in the largest matching point pair cluster to corresponding points in the second frame.

4. The method of claim 3, further comprising:
   calculating an average point projection error for the first frame, where the projected error is a distance between a predicted point and an actual point determined using the global transformation matrix;
   generating a confidence value based on the global transformation matrix and the average projected error for the first frame.

5. The method of claim 4, further comprising:
   presenting a graphical representation of the confidence value calculated for the first frame of the video on a display of the computing device.

6. The method of claim 4, further comprising:
   determining that the confidence value is below a threshold value; and
   in response to determining that the confidence value is below a threshold value, reacquiring the object in the second frame by performing an object recognition method using a scale invariant feature transform descriptor.

7. A non-transitory computer-readable medium including one or more sequences of instructions that, when executed by one or more processors, causes:
   receiving, by a computing device, user input identifying an image area of a first frame of a video, the image area including an object to be tracked from the first frame to a second frame of the video by the computing device;
   selecting, by the computing device, interest points within the image area; filtering, by the computing device, the selected interest points using a non-maximum suppression filter;
   generating, by the computing device, matching point pairs based on the filtered interest points, where each point pair in the matching point pairs includes a first selected interest point in the first frame and a corresponding predicted point in the second frame, where the predicted point in the second frame is determined by tracking the particular interest point from the first frame to the corresponding predicted point in the second frame;

pruning, by the computing device, one or more point pairs in the matching point pairs by clustering the matching point pairs and removing matching point pairs that do not belong to a cluster having a largest number of matching point pairs; and tracking, by the computing device, the object in the first frame to the second frame based on the interest points in the matching point pairs that belong to the largest matching point pair cluster;

wherein the non-maximum suppression filter is a double-pass non-maximum suppression filter that uses two concentric radii to filter interest points on a first pass through the selected interest points and a single radius to filter interest points on a second pass through the selected interest points.

8. The non-transitory computer-readable medium of claim 7, wherein the instructions that cause pruning include instructions that cause:

determining a distance between the interest point and the corresponding predicted point in each of the corresponding pairs in the matching point pairs; and clustering the matching point pairs by performing k-means clustering based on distances corresponding to each matching point pair to generate two or more clusters of matching point pairs.

9. The non-transitory computer-readable medium of claim 7, wherein the instructions cause:

generating a global transformation matrix which maps the interest points in the first frame that are included in the largest matching point pair cluster to corresponding points in the second frame.

10. The non-transitory computer-readable medium of claim 9, wherein the instructions cause:

calculating an average point projection error for the first frame, where the projected error is a distance between a predicted point and an actual point determined using the global transformation matrix;

generating a confidence value based on the global transformation matrix and the average projected error for the first frame.

11. The non-transitory computer-readable medium of claim 10, wherein the instructions cause:

presenting a graphical representation of the confidence value calculated for the first frame of the video on a display of the computing device.

12. The non-transitory computer-readable medium of claim 10, wherein the instructions cause:

determining that the confidence value is below a threshold value; and in response to determining that the confidence value is below a threshold value, reacquiring the object in the second frame by performing an object recognition method using a scale invariant feature transform descriptor.

13. A computing device comprising:
one or more processors; and
a non-transitory computer-readable medium including one or more sequences of instructions that, when executed by the one or more processors, causes:
receiving, by the computing device, user input identifying an image area of a first frame of a video, the image area including an object to be tracked from the first frame to a second frame of the video by the computing device;
selecting, by the computing device, interest points within the image area;

filtering, by the computing device, the selected interest points using a non-maximum suppression filter;

generating, by the computing device, matching point pairs based on the filtered interest points, where each point pair in the matching point pairs includes a first selected interest, point in the first frame and a corresponding predicted point in the second frame, where the predicted point in the second frame is determined by tracking the particular interest point from the first frame to the corresponding predicted point in the second frame;

pruning, by the computing device, one or more point pairs in the matching point pairs by clustering the matching point pairs and removing matching point pairs that do not belong to a cluster having a largest number of matching point pairs;

and tracking, by the computing, device, the object in the first frame to the second frame based on the interest points in the matching point pairs that belong to the largest matching point pair cluster;

wherein the non-maximum suppression filler is a double-pass non-maximum suppression filter that uses two concentric radii to filter interest points on a first pass through the selected interest points and a single radius to filter interest points on a second pass through the selected interest points.

14. The computing device of claim 13, wherein the instructions that cause pruning include instructions that cause:

determining a distance between the interest point and the corresponding predicted point in each of the corresponding pairs in the matching point pairs; and clustering the matching point pairs by performing k-means clustering based on distances corresponding to each matching point pair to generate two or more clusters of matching point pairs.

15. The computing device of claim 13, wherein the instructions cause:

generating a global transformation matrix which maps the interest points in the first frame that are included in the largest matching point pair cluster to corresponding points in the second frame.

16. The computing device of claim 15, wherein the instructions cause:

calculating an average point projection error for the first frame, where the projected error is a distance between a predicted point and an actual point determined using the global transformation matrix;

generating a confidence value based on the global transformation matrix and the average projected error for the first frame.

17. The computing device of claim 16, wherein the instructions cause:

presenting a graphical representation of the confidence value calculated for the first frame of the video on a display of the computing device.

18. The computing device of claim 16, wherein the instructions cause:

determining that the confidence value is below a threshold value; and in response to determining that the confidence value is below a threshold value, reacquiring the object in the second frame by performing an object recognition method using a scale invariant feature transform descriptor.

* * * * *